Patented May 7, 1929.

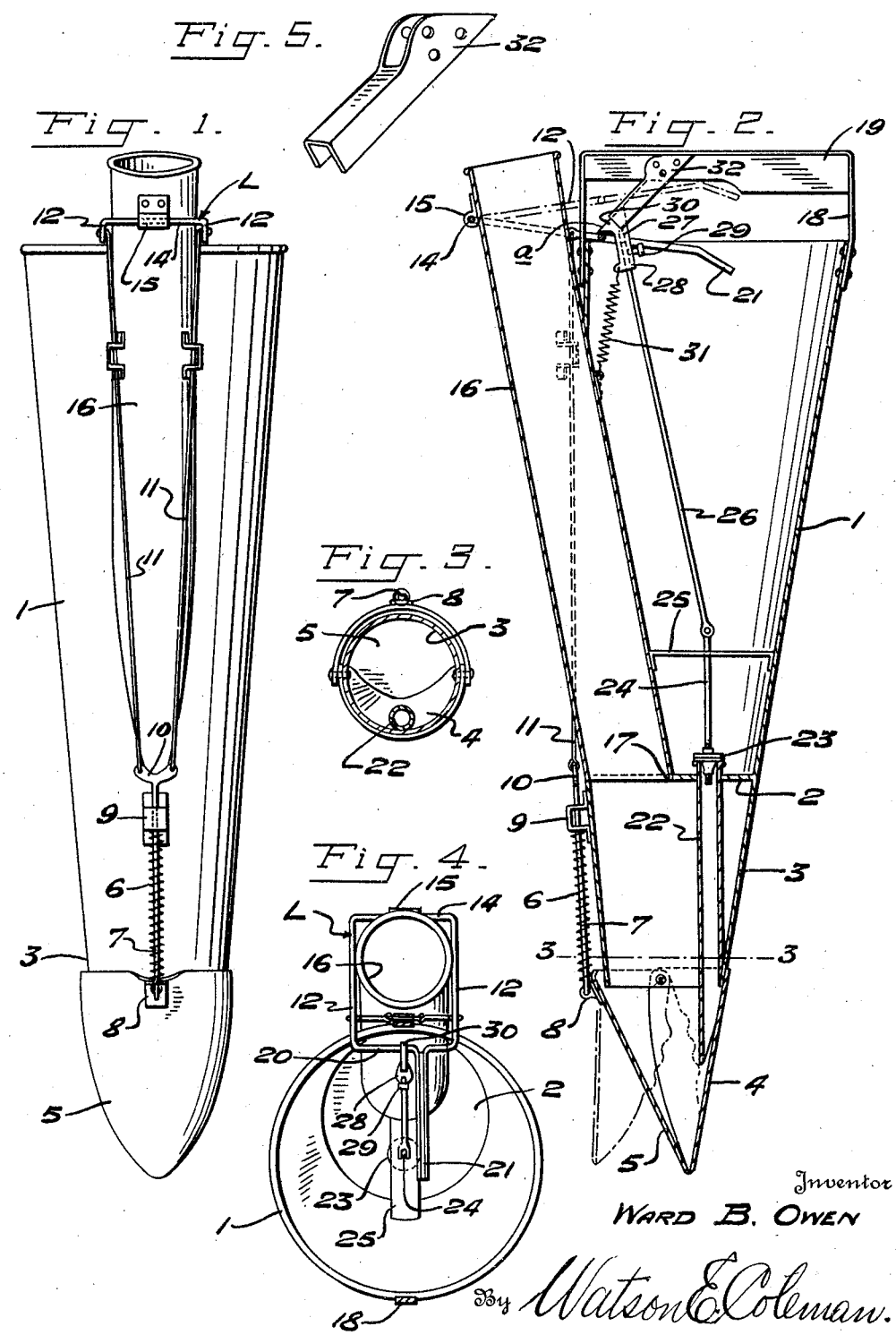

1,711,612

UNITED STATES PATENT OFFICE.

WARD B. OWEN, OF NATHALIE, VIRGINIA.

TOBACCO PLANTER.

Application filed August 30, 1927. Serial No. 216,458.

This invention relates to a tobacco planter and it is an object of the invention to provide a device of this kind whereby the desired supply of water is discharged before the setting of the plant and in a manner whereby dry dirt may fall around the plant and cover all the water.

Another object of the invention is to provide a device of this kind wherein the requisite discharge of water is accomplished automatically.

The invention consists in the details of construction and in the combination and arrangement of the several parts of my improved tobacco planter whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:—

Figure 1 is a view in elevation of a planter constructed in accordance with an embodiment of my invention;

Figure 2 is a vertical sectional view taken through the structure shown in Figure 1 with certain of the parts in elevation;

Figure 3 is a sectional view taken substantially on the line 3—3 of Figure 2;

Figure 4 is a view in top plan of the structure as herein disclosed with the hand grip removed;

Figure 5 is a view in perspective unapplied of the member depending from the hand grip for coaction with the latch.

As disclosed in the accompanying drawing, 1 denotes a body member or reservoir of desired dimensions and of preferred capacity closed at its lower end by a bottom plate 2. Depending from the bottom portion of the body member 1 is a tubular throat 3 of requisite dimensions having suitably secured to the lower portion thereof a stationary shovel 4 and a swinging shovel 5. The shovel 5 is constantly urged toward the shovel 4 by an expansible member 6, herein disclosed as a coil spring, encircling a rod 7, one end portion of which being operatively engaged with an ear 8 carried by the upper portion of the shovel 5 and having its opposite or upper end portion freely insertible through a guide member 9 carried by the upper portion of the throat 3.

The spring 6 is interposed between and bears against the guide member 9 and the ear 8. The rod 7 above the guide member 9 is provided with a cross head 10 to the extremities of which are operatively engaged the members 11. These members 11 extend upwardly of the body member 1 and are operatively connected to the side members 12 of a lever L. This lever L is oblong in shape and has one end member 14 pivotally connected, as at 15, with the outer portion of the upper part of a plant chute 16. This plant chute 16 is cylindrical in form and extends downwardly and inwardly of the body member 1 to the bottom plate 2, said plate having an opening 17 in communication therewith. As herein disclosed, the upper portion of this chute 16 is exterior of the body member 1 so that a tobacco plant may be readily inserted therein.

The upper portion of the body member 1 has operatively engaged therewith through the instrumentality of a strap 18 or the like a hand grip 19 whereby the device in its entirety may be readily transported. The lever L has its free cross member 20 at its central portion provided with an outstanding extension 21 which is adapted to be grasped by the hand of the operator for a purpose to be hereinafter referred to.

In communication with the lower portion of the body member or reservoir 1 and extending through the bottom plate 2 thereof is a discharge pipe 22 which terminates in relatively close proximity to the lower or outer end portion of the shovel 4. This pipe extends slightly above the bottom plate 2 in order to reduce to a minimum the liability of the same becoming clogged by sediment.

The upper portion of this pipe 22 is rounded to provide a seat for the valve 23. This valve is provided with an upstanding stem 24 freely disposed through a guide member 25 interposed between and operatively supported by the inserted portion of the plant chute 16 and a wall of the member or reservoir 1. At a point above this guide member 25 the stem 24 has pivotally connected thereto a rod or wire 26 which extends upwardly to a point adjacent the upper end of the body member or reservoir 1. This upper end portion of the rod or wire 26 is insertible within a bore 27 provided in a shank 28 and held thereto by a clamp screw 29. The shank 28 is provided at its outer end with a latch head 30 which is adapted to engage over the cross member 20 when the lever L is in its lowered position so that upon upward movement of the lever the valve 23 will be raised or moved into open position.

Secured to the lower portion of the shank 28 and to the adjacent wall of the member or reservoir 1 is a retractile member 31, preferably a coil spring, which operates to constantly urge the valve 23 into closed position and also maintains the latch normally in requisite engagement with the cross member 20 hereinbefore referred to.

The handle member 19 at the end thereof adjacent to the plant chute is provided with a downwardly and outwardly inclined member 32 in the form of an inverted U in cross section and with the intermediate portion of which the beveled edge $a$ of the latch head 30 contacts.

Upon upward movement of the lever L the contact of the latch head 30 with the member 32 will result in the latch head being freed from the cross member 20 when the valve 23 has been raised a predetermined distance whereupon the valve 23 will be automatically returned to closed position. The purpose of this operation will hereinafter be more particularly referred to.

In practice the body member or reservoir 1 is filled with a supply of water and in setting a plant the closed shovels 4 and 5 are forced into the ground and a plant dropped through the chute 16. The planter is then raised by imposing pull on the extension 21 of the lever L and initially the valve 23 will be opened to permit requisite discharge of water. As the planter continues to rise the valve 23 will automatically close and the shovel 5 swing away from the shovel 4 permitting the desired setting of the plant in the soil. As the shovels are entirely removed from the ground the dry soil will fall around the set plant to cover up all the water, thus assuring a desired placement of the plant.

From the foregoing description it is thought to be obvious that a tobacco planter constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A planter of the class described comprising a reservoir, a hand grip carried by the reservoir and disposed over the upper end thereof, a throat depending therefrom and in communication therewith, a plant chute in communication with the throat and extending exteriorly of the throat and reservoir, relatively movable shovels carried by the throat, a lever carried by the exterior portion of the plant chute, and having a portion underlying the hand grip, an operative connection between the lever and one of the shovels for separating said shovels upon movement of the lever in one direction, a normally closed valve for controlling the communication between the reservoir throat, and means coacting with the lever for automatically moving the valve into open position upon initial movement of the lever in a direction to effect a separation of the shovels, and means carried by the hand grip to free the last named means after the lever has been moved a predetermined distance.

2. A planter of the class described including a reservoir, relatively movable shovels carried thereby, said reservoir discharging between the shovels, a normally closed valve for controlling the discharge from the reservoir, a hand grip carried by the reservoir, a lever operatively carried by the reservoir and having a portion arranged adjacent to the hand grip, a member operatively engaged with the valve, a latch head carried by said member and engaged with the lever when the valve is in its normally closed position to permit initial movement of the lever to move the valve into open position, and means carried by the hand grip to engage the latch head upon further movement of the lever to free the head from the lever to permit the valve to return to its closed position.

3. A planter of the class described including a reservoir, relatively movable shovels carried thereby, said reservoir discharging between the shovels, a normally closed valve for controlling the discharge from the reservoir, a hand grip carried by the reservoir, a lever operatively carried by the reservoir and having a portion arranged adjacent to the hand grip, a member operatively engaged with the valve, a latch head carried by said member and engaged with the lever when the valve is in its normally closed position to permit initial movement of the lever to move the valve into open position, a member carried by the hand grip with which the head contacts upon further movement of the lever to free the head from the lever to permit the valve to return to its closed position, said second member being disposed on an inward incline toward the head and constantly in contact therewith.

4. A planter of the class described including a reservoir, relatively movable shovels carried thereby, said reservoir discharging between the shovels, a normally closed valve for controlling the discharge from the reservoir, a hand grip carried by the reservoir, a lever operatively carried by the reservoir and having a portion arranged adjacent to the hand grip, a member operatively engaged with the valve, a latch head carried by said member and engaged with the lever when the valve is in its normally closed position to permit initial movement of the lever to move the valve into open position, a member carried by the hand grip with which the head contacts upon further movement of the lever to free the head from the lever to permit the valve to return to its closed position, said second member being disposed on an inward incline toward the head and constantly in contact therewith, the portion of the head with which the second member contacts being beveled.

5. A planter of the class described including a reservoir, relatively movable shovels carried thereby, said reservoir discharging between the shovels, a normally closed valve for controlling the discharge from the reservoir, a hand grip carried by the reservoir, a lever operatively carried by the reservoir and having a portion arranged adjacent to the hand grip, a member operatively engaged with the valve, a latch head carried by said member and engaged with the lever when the valve is in its normally closed position to permit initial movement of the lever to move the valve into open position, a member carried by the hand grip with which the head contacts upon further movement of the lever to free the head from the lever to permit the valve to return to its closed position, said second member being disposed on an inward incline toward the head and constantly in contact therewith, said second member in cross section being in the form of an inverted U.

6. A planter of the class described including a reservoir, relatively movable shovels carried thereby, said reservoir discharging between the shovels, a normally closed valve for controlling the discharge from the reservoir, a hand grip carried by the reservoir, a lever operatively carried by the reservoir and having a portion arranged adjacent to the hand grip, a member operatively engaged with the valve, a latch head carried by said member and engaged with the lever when the valve is in its normally closed position to permit initial movement of the lever to move the valve into open position, means carried by the hand grip to engage the latch head upon further movement of the lever to free the head from the lever to permit the valve to return to its closed position, and a spring operatively connected with the first member and the reservoir for maintaining the valve in its normal position.

In testimony whereof I hereunto affix my signature.

WARD B. OWEN.